United States Patent [19]

Koch et al.

[11] Patent Number: 4,695,390
[45] Date of Patent: Sep. 22, 1987

[54] REACTION PRODUCT OF POLYALRYLENE-SUBSTITUTED POLYCARBOXYLIC ACID ACYLATING AGENT, POLYAMINE AND SULFOLENE AS A DISPERSANT

[75] Inventors: Frederick W. Koch, Willoughby Hills; Joseph W. Pialet, Euclid, both of Ohio

[73] Assignee: The Lubrizol Corporation, Wickliffe, Ohio

[21] Appl. No.: 688,785

[22] Filed: Jan. 4, 1985

[51] Int. Cl.$^4$ .................. C10M 1/20; C10M 1/32; C10M 1/38
[52] U.S. Cl. ................. 252/47.5; 548/520; 548/546
[58] Field of Search ............ 252/47.5; 548/520, 546

[56] References Cited

U.S. PATENT DOCUMENTS

| | | | |
|---|---|---|---|
| 2,372,161 | 3/1945 | Morris et al. | 260/128 |
| 2,435,071 | 1/1948 | Evans et al. | 260/329 |
| 2,461,341 | 2/1949 | Morris et al. | 260/329 |
| 2,530,070 | 11/1950 | Morris et al. | 260/247.1 |
| 3,272,746 | 9/1966 | LeSuer et al. | 252/47.5 |
| 3,367,864 | 2/1968 | Elliott et al. | 252/32.7 |
| 3,674,691 | 7/1972 | Karll | 252/47.5 |
| 3,676,346 | 7/1972 | Hu | 252/47.5 |
| 3,725,434 | 4/1973 | Elliott et al. | 260/326.3 |
| 3,749,695 | 7/1973 | de Vries | 252/47.5 |
| 3,992,306 | 11/1976 | Diery et al. | 252/33.6 |
| 4,029,587 | 6/1977 | Koch | 252/48.2 |
| 4,029,588 | 6/1977 | Koch | 252/48.2 |
| 4,194,982 | 3/1980 | Chou | 252/47.5 |
| 4,237,020 | 12/1980 | Papay et al. | 252/47.5 |
| 4,275,006 | 6/1981 | Erdman | 260/326.5 |

*Primary Examiner*—W. J. Shine
*Attorney, Agent, or Firm*—Denis A. Polyn; Forrest L. Collins; Karl Bozicevic

[57] ABSTRACT

An oil-soluble dispersant containing sulfolane groups therein. The dispersant is made by reacting at least one polycarboxylic acid acylating agent having at least one polyalkene substituent of high or low molecular weight with a (B) polyamine and a (C) sulfolene. Desirably, the polyamine is branched or contains amino side chains and thus contains a plurality of primary amines. The acylating agents are characterized by the presence within their structure of at least 0.5 acylating groups for each equivalent weight of the polyalkene substituent. The compositions are useful in various motor oils, marine oils, automatic transmission fluids and the like.

40 Claims, No Drawings

REACTION PRODUCT OF POLYALRYLENE-SUBSTITUTED POLYCARBOXYLIC ACID ACYLATING AGENT, POLYAMINE AND SULFOLENE AS A DISPERSANT

BACKGROUND OF THE INVENTION

The present invention relates to the utilization of sulfolenes to form oil dispersants. The sulfolenes are reacted with polyamines to form an adduct. The adduct, in turn, is reacted with at least one polycarboxylic acid acylating agent having a polyalkene substituent.

TECHNICAL FIELD OF THE INVENTION

U.S. Pat. No. 3,367,864 to Elliott relates to an additive for lubricating compositions which is obtained by reacting a sultone with a reagent containing at least one long saturated or unsaturated alkyl chain linked through an ester, an amide, or an imide grouping to a grouping having at least one basic nitrogen atom. In essence, a sulfonic acid compound is formed. Such compounds tend to be very acidic and relate to compounds as well as chemistry different from that of the present invention.

U.S. Pat. No. 3,749,695 to De Vries relates to lubricating oil compositions which are the reaction products of hydrocarbyl-substituted polyamines or succimides with alkane sultones. This patent also relates to a sulfonic acid type compound, to a completely different type of chemistry and does not contain any suggestion of any sulfolenes.

U.S. Pat. No. 2,372,161 to Morris relates to reaction products formed by the addition of sulfur to substituted and unsubstituted sulpholanylamines and sulpholenylamines in which at least one of the hydrogen atoms of the amino radical is substituted by an unsaturated acyl radical. Such a compound does not contain a polyamine, a high molecular weight acylating agent having at least one polyalkene substituent thereon, and the like.

U.S. Pat. No. 2,461,341 to Morris relates to sulfolanyl and sulfolenyl secondary amines having the amino-nitrogen atom directly attached to a cyclic organic radical. This patent is not pertinent in that there is no suggestion of a polyamine, or a high molecular weight acylating agent having at least one polyalkene substituent. Furthermore, the compound is generally not a dispersant.

U.S. Pat. No. 2,530,070 to Morris relates to a sulfolanyl and sulfolenyl amines wherein the sulfolanyl and sulfolenyl nucleus is attached to an amino nitrogen atom which is a member of a heterocyclic radical containing in addition to the amino-nitrogen atom, carbon and oxygen. As with Morris U.S. Pat. No. 2,461,341, this compound lacks any suggestion of a polyamine as well as a high molecular weight component.

U.S. Pat. No. 2,435,071 to Evans is directed to substituted and unsubstituted sulfolanylamines and sulfolenylamines at which at least one of the hydrogen atoms of the amino radical is substituted by an acyl radical. Once again, no suggestion is made of a polyalkylene amine compound or of a high molecular weight component.

U.S. Pat. No. 3,725,434 to Scotchford relates to long chain sulfonated amine compounds having amide or imide linkages which are prepared by polymerizing a compound containing a polymerizable aziridine ring with sulfurous acid and reacting the resulting sulfur-containing polyalkylene polyamine with a long chain carboxylic acid, such as a long chain mono-alkenyl succinic acid or anhydride. The end result is a sulfonic acid-type compound.

U.S. Pat. No. 4,237,020 to Papay relates to an N-aliphatic hydrocarbyl hydroxyalkylsulfinylsuccinimide or N-aliphatic hydrocarbyl hydroxyalkylsulfonylsuccinimide. This patent contains no suggestion of a polyamine, or a high molecular weight acylating agent having a polyalkene substituent.

U.S. Pat. No. 4,194,982 relates to a N-sulfonated hydrocarbon-substituted succinimide. Lacking is any suggestion of a polyamine or a sulfoline substituted polyamine.

U.S. Pat. No. 3,674,691 to Karll relates to polymethylene polyamine sulfonamides of alkyl-substituted phenolic sulfonic acids. Thus, it does not contain any sulfolane groups or the like.

U.S. Pat. No. 3,676,346 to Hu relates to ashless dispersants which are the polyalkylene polyamine condensation products of alkenyl succinic acids or anhydrides. The compound is essentially a pour-point-depressant and lacks any suggestion of a compound formed by utilizing a sulfolene.

U.S. Pat. No. 3,992,306 to Diery relates to a bissulfonamidocarboxylic acid. The compound is essentially a diamine derivative and hence is not pertinent and it does not contain a polyamine compound or a high molecular weight component.

U.S. Pat. No. 4,275,006 to Erdman relates to reacting oil-soluble dispersant compositions containing at least one primary or secondary amino group with $SO_2$. As such it relates to an entirely different compound of that set forth in the present invention.

U.S. Pat. No. 3,272,746 to LeSuer relates to an oil-soluble acylated nitrogen compound. No teaching is made of the utilization of a sulfolene compound.

U.S. Pat. Nos. 4,029,587 and 4,029,588 to Koch relate to the use of hydrocarbon-substituted sulfolanes which are useful for swelling seals in machinery and hence are not pertinent.

SUMMARY OF THE INVENTION

It is therefore an aspect of the present invention to provide an oil-soluble dispersant made by reacting a polyamine, a sulfolene and a polyalkene substituted polycarboxylic acid acylating agent.

It is a further aspect of the present invention to provide a dispersant, as above, wherein said sulfolene has one or two substituents thereon for each carbon atom therein, wherein said substituent is generally hydrogen, an aliphatic, an aromatic, or combinations thereof.

It is a still further aspect of the present invention to provide an oil-soluble dispersant, as above, wherein said acylating agents can have within their structure an average of at least 0.5 acylating groups for each equivalent weight of said polyalkene, or an average of at least 1.3 acylating groups for each equivalent weight of said polyalkene wherein the polyalkene-acylating agent imparts improved viscosity to the oil.

These and other aspects of the present invention will become apparent from the following detailed specification.

In general, an oil-soluble dispersant composition comprises the reaction product of (A) at least one polycarboxylic acid acylating agent having at least one polyalkene substituent having an Mn value of about 300 to about 5000, preferably about 300 to about 1500 and an Mw value of about 500 to about 4500, preferably about 500 to about 2000 with (B) a polyamine and (C) a sulfolene, said acylating agents having within their structure an average of at least 0.5 acylating groups for each equivalent weight of said polyalkene group.

DESCRIPTION OF THE PREFERRED EMBODIMENT

According to the present invention, an oil-soluble dispersant composition containing sulfolane therein is produced. Initially, (C) sulfolenes are reacted with (A) polyalkene-substituted polycarboxylic acid acylating agents and (B) polyamines. The (B) polyamines generally contain at least one primary amine and desirably from about 2 to about 5. Accordingly, the polyamines desirable contain branched amine groups. The polyamines conform for the most part to the formula

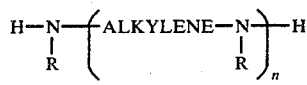

wherein n is an integer of from 20 or less, preferably 10 or less. Although R can be hydrogen, desirably it is substantially a hydrocarbon containing up to 30 carbon atoms and preferably up to and including 8 carbon atoms, an amino-substituted hydrocarbon having up to and including 30 carbon atoms, and preferably up to and including 8 carbon atoms, a polyamino-substituted hydrocarbon having up to and including 6 amino groups and up to and including 30 carbon atoms, preferably up to and including 8 carbon atoms, or a hydroxyalkyl substituent wherein said alkyl group has from 1 to 6 carbon atoms. The "ALKYLENE" group has from 1 to 10 carbon atoms and preferably from 1 to 6 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologs of amines such as piperazines and amino-alkyl-substituted piperazines. They are exemplified specifically by: ethylene diamine, triethylene tetramine, propylene diamine, decamethylene diamine, octamethylene diamine, di(-heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methyl-imidazoline, 1,3-bis(2-aminoethyl)imidazoline, pyrimidine, 1-(2-aminopropyl)piperazine, 1,4-bis(2-aminoethyl)piperazine, and 2-methyl-1-(2-aminobutyl)piperazine. Higher homologs such as are obtained by condensing two or more of the above-illustrated alkylene amines likewise are useful.

The ethylene amines are especially useful. They are described in some detail under the heading "Ethylene Amines" in "Encyclopedia of Chemical Technology", Kirk and Othmer, Vol. 5, pp. 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

Especially suitable polyamines include those having an amino side chain R such as methyl amine, ethyl amine, propyl amine, butyl amine, pentyl amine, hexyl amine, heptyl amine, decyl amine, dodecyl amine, and the like. Also especially suited are the polyamines which include a polyamino side chain R such as triethyl diamine, propyl diamine, ethylene diamine, and ethyl piperazine.

Although to a lesser extent, hydroxy alkyl-substituted alkylene amines, i.e., alkylene amines having one or more hydroxyalkyl substituents on the nitrogen atoms, are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl)-ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, di-hydroxypropyl-substituted tetraethylene pentamine, N-(3-hydroxypropyl)tetramethylene diamine, and 2-heptadecyl-1-(2-hydroxyethyl)imidazoline.

Higher homologs such as are obtained by condensation of the above-illustrated alkylene amines or hydroxy alkyl-substituted alkylene amines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

The (C) sulfolenes can generally be represented by the formula

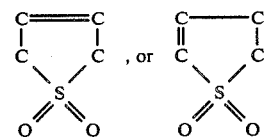

The (C) sulfolene can have 1 or 2 substituents on each carbon atom and thus a total of up to 6 substituents for the entire molecule. Generally the sulfolene contains a total of 1 or 2 substituents with 0 or 1 substituent being desirable. The lack of any substituents is often preferred. That is, when no substituent is present, the carbon atoms have a hydrogen atom(s) thereon. The substituents with regard to each possible location can be either similar or different. Examples of substituents which generally are substantially hydrocarbon include an aliphatic having from 1 to 18 carbon atoms such as methyl, a cycloaliphatic having from 4 to 10 carbon atoms such as cyclohexyl, an aromatic substituted aliphatic having from 7 to 18 carbon atoms such as phenyl ethyl, an aromatic such as phenyl or naphthyl or an aliphatic substituted aromatic having from 6 to 18 carbon atoms such as methyl phenyl. More desired substituents include an alkyl having from 1 to 18 carbon atoms such as methyl, ethyl, propyl, isopropyl, butyl, isobutyl, pentyl, neopentyl, hexyl, and the like. The cycloalkyls having from 5 to 8 carbon atoms are also a desired group and examples include cyclopentyl, cyclohexyl, cyclooctyl, and the like. The alkenyls having from 2 to 18 carbon atoms can also be utilized such as ethylene, propylene, butylene, isobutylene, pentenylene and the like. Phenyl constitutes a desired aromatic compound. Another desired compound are the aryalkyl having from 7 to 12 carbon atoms such as benzyl. The alkylaryls constitute another desired group and they have from 7 to 12 carbon atoms. A preferred hydrocarbon substituent is methyl. A non-hydrocarbon substituent is sulfur, for example, sulfur coupled sulfolenes.

The various hydrocarbon substituent groups as set forth above can also contain one or more, preferably one functional group thereon. Suitable functional groups include COOH, Cl, N, OH, CO, $OR^3$, $COOR^3$ and S wherein $R^3$ is an alkyl having from 1 to 20 carbon atoms, with 1 to 10 carbon atoms being preferred. Thus, the various aliphatic or aromatic substituents or combinations thereof can be chlorinated, contain an amine, and a hydroxide, or the like. Examples include methyl chloride, methyl alcohol, methyl amine, acetic acid, ethyl chloride, ethylamine, ethyl hydroxide, and the like.

A preferred substituent group is methyl or hydrogen. Thus a highly suitable compound is 2-methyl sulfolene, 2,3-dimethyl sulfolene and the like. A highly preferred compound is wherein the substituent is hydrogen, that is sulfolene.

The (C) sulfolene is generally reacted with (B) polyamine to form the (BC) adduct usually by adding the two items together and mixing during the application of heat. Although ambient temperature can be utilized such as 15° C., the reaction rate is generally slow due to low solubility of the sulfolene and high viscosity of the mixture. The upper heating temperature is limited only by the decomposition temperature of the ingredients. Although the decomposition rate varies with temperature, it usually is not appreciable until a temperature of approximately 70° C. or 80° C. is reached although much higher temperature can be utilized when the mixture is subjected thereto for short periods of time such as a few minutes. Thus, decomposition temperatures as high as 130° C. can be utilized. Generally, a suitable reaction temperature is from about 15° to about 90° C. with a more suitable temperature being from about 30° to about 80° C. Although pressure can be utilized, typically atmospheric pressure is utilized. The amount of polyamine utilized is generally an excess based upon the number of nitrogen atoms therein to an equivalent amount of sulfolene. Thus, the total amount of polyamine utilized contains from 1 to 10 and desirably from 1 to 5 nitrogen atoms per equivalent of sulfolene.

The acylating agents (A) utilized in the present invention are known to those skilled in the art as well as to the literature. See, for example, the following U.S. Pat. Nos. which are hereby incorporated by reference for their disclosures relating to carboxylic acid acylating agents: 4,448,703; 4,447,348; 4,234,435; 3,219,666; 3,272,746; 3,381,022; 3,254,025; 3,278,550; and the like. The polycarboxylic acid acylating agent generally can be characterized by the presence within their structure of two groups or moieties. The first group or moiety is generally referred to herein as the "substituent group(s)" and is derived from a polyalkene. The second group or moiety is referred to herein as "acylating agents(s)" of the "succinic group(s)". The succinic group or acylating agent can generally have a formula or structure as set forth in the above-identified U.S. patents which are hereby fully incorporated by reference for this purpose. A suitable acylating agent of the present invention contains succinic groups normally corresponding to the formula

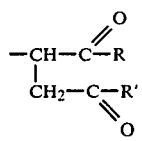

wherein R and R' are each independently selected from the group consisting of —OH, —Cl, —O-lower alkyl, and when taken together, R and R' are —O—. In the latter case, the succinic group is a succinic anhydride group. All the succinic groups in a particular succinic acylating agent need not be the same, but they can be the same. Preferably, the succinic groups will correspond to

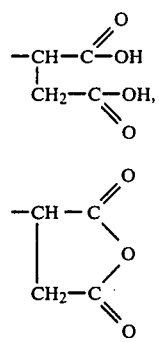

and mixtures thereof. Providing substituted succinic acylating agents wherein the succinic groups are the same or different is within the ordinary skill of the art and can be accomplished through conventional procedures such as treating the substituted succinic acylating agents themselves (for example, hydrolyzing the anhydride to the free acid or converting the free acid to an acid chloride with thionyl chloride) and/or selecting the appropriate maleic or fumaric reactants.

The substituted succinic acylating agents are characterized by the presence within their structure of various amounts of succinic groups for each equivalent weight of substituent groups. For purposes of this invention, the number of equivalent weights of substituent groups is deemed to be the number corresponding to the quotient obtained by dividing the Mn value of the polyalkene from which the substituent is derived into the total weight of the substituent groups present in the substituted succinic acylating agents. Thus, by way of example, if a substituted succinic acylating agent is characterized by a total weight of substituent group of 40,000 and the Mn value for the polyalkene from which the substituent groups are derived is 2000, then that substituted succinic acylating agent is characterized by a total of 20 (40,000/2000=20) equivalent weights of substituent groups.

According to the present invention, two general types of substituted acylating agents are utilized. One type relates generally to an agent having a high molecular weight substituent thereon and generally containing a minimum number of acylating or succinic groups for each equivalent weight of substituent group such as at least about 0.5 and desirably at least 1.3. This type of substituted acylating agent generally has an improved viscosity, especially over a range of temperatures. Thus, this type of substituted acylating agent can be utilized as a viscosity improver as in oil. The remaining type of substituted acylating agent generally has a lower molecular weight with regard to the substituent and usually a lower number of acylating or succinic groups for each equivalent weight of substituent group. This second type of substituted acylating agent is generally referred to as a low molecular weight substituent. As with many premises of the scientific world, it is to be clearly understood that there is no definite demarcation point between a so-called low molecular weight substituent, and a high molecular weight substituent since the two types actually blend or merge into one another over a range of molecular weights as well as equivalent weights. The so-called lower molecular weight substituted acylating agent also acts as a viscosity improver, but generally in a much more confined temperature range.

Considering the so-called high molecular weight substituent, it generally has a number average molecular weight, that is Mn of from about 900 to about 5000. Desirably, a minimum Mn value of about 1500 can be utilized with a more preferred range being from bout 1500 to about 3200. A more preferred Mn value is from about 1500 to about 2800 with the most preferred range being from about 1500 to about 2400. The valves of the ratio of the weight average molecular weight to the number average molcular weight, that is Mw/Mn is from about 1.5 to about 4.0. A minimum ratio of at least 1.8 up to about 3.6 is desired. A more preferred ratio is from about 2.0 to about 3.4 with an especially preferred Mw/Mn value of about 2.5 to about 3.2 being especially preferred. With regard to the minimum number of acylating or succinic groups for each equivalent weight of substituent group, it is approximately 0.5, as noted above. Desirably, the minimum value will be about 1.4 or greater, and usually from at least 1.3, more desirably 1.4 to about 3.5. A preferred range is from about 1.5 to about 2.5 succinic groups per equivalent weight of substituent groups.

With regard to the lower molecular weight substituent, a Mn value of from about 300 to about 1500 can be utilized. As previously noted, this value slightly overlaps with the so-called higher molecular weight substituent. Typically, the low molecular weight type substituent has a maximum Mn value of about 1200. A preferred range is about 700 to about 1200. The Mw value of the lower weight substituent is from about 500 and more desirably from about 900 to about 4500. A desirable Mw value is from about 900 to about 3500. A preferred range for this type of compound is from about 1800 to about 3500. With regard to the minimum number of acylating or succinic groups for each equivalent weight of substituent group, it is at least 0.5. A more desired value is 0.7. The maximum equivalent succinic groups for each equivalent weight of substituent group is approximately up to 3.5 although a value of 1.3 is more preferred. A more preferred value is at least 1.0.

The various Mn, Mw as well as the ratio Mw/Mn values for the polyalkene for purposes of this invention were determined by gel permeation chromatography (GPC). This separation method involves column chromatography in which the stationary phase is porous, cross-linked polystyrene gel varying in prosity over many orders of magnitude. As the liquid phase (tetrahydrofuran) containing the polymer sample passes through the column, the polymer molecules enter those pores large enough to accept them. Large molecules have only a small number of pores available to enter and will pass through the column rapidly. Small molecules will enter most of the pores and will take longer to pass through the column. Thus, the solute molecules are separated by their MOLECULAR SIZES. The concentration of the species in the solvent stream eluting from the column is monitored continuously by various types of detectors. The most commonly used detector is a differential refractometer which measures the diference in refractive index between the pure solvent and polymer solution. This difference is proportional to the concentration of the polymer in solution. Other types of detectors include a UV absorption and laser light scattering.

The Mn and Mw values of the polyalkenes of this invention can be obtained by one of ordinary skill in the art by the comparison of the distribution data obtained to a series of calibration standards of polymers of known molecular weight distribution. For purposes of this invention a series of fractionated polymers of isobutene, polyisobutene being the preferred embodiment, is used as the calibration standard.

For example, the molecular weight values disclosed herein are obtained using a Waters Associated model 200 gel permeation chromatograph equipped with a 2.5 ml. syphon, a 2 ml. sample injection loop and five stainless steel columns 7.8 mm. in diameter by 122 centimeters long. Each column was packed with STYRAGEL ®, a commercially available, rigid, porous gel (in particle form) of cross-linked styrene/divinyl benzene copolymers. These gels are also obtained from Waters Associates. The first column contains STYRAGEL ® column-type $10^4$ A. The remaining columns contain STYRAGEL ® column-types $10^3$ A, 250 A, 100 A, and 60 A. These columns are connected in series by short links of tubing.

Calibration standards were prepared by fractionating a polyisobutylene sample having a specific gravity at 60° F. (15.6° C.) of 0.89 and a viscosity at 210° F. (99° C.) of 12.50 SUS. A sample of this polymer is fractionated by dialysis using a rubber membrane and a soxhlet extraction apparatus with refluxing petroleum ether as solvents. Eleven fractions were taken; one sample each hour for the first seven hours, then three samples each four hours, and finally the residue which did not permeate the membrane over a four-hour period and the Mn of each was measured using vapor phase osmometry and benzene solvent.

Each calibration sample is then chromatographed. Approximately 7 mg. of sample is weighed into a small bottle which is then filled with 4 ml. of reagent grade tetrahydrofuran. The sealed bottle is stored overnight before analysis. The afore-described liquid phase chromatograph is degassed at 59° C. and a flow rate of 2.0 ml. per minute of tetrahydrofuran maintained. Sample pressure is 180 psi. and the reference pressure 175 psi. The retention time of each sample is measured. The retention molecular weights for each sample, which are shown in the following table, were plotted to provide a standardization curve. The Mn and Mw for sample polymers is then obtained using this curve and the methods described in "Topics in Chemical Instrumentation, Volume XXIX, Gel Permeation Chromatography" by Jack Cages, published in The Journal of Chemical Education, Volume 43, numbers 7 and 8 (1966).

TABLE

| Count* | Mol. Wt. | Count* | Mol. Wt. | Count* | Mol. Wt. |
|---|---|---|---|---|---|
| 30 | 42240 | 40 | 638 | 50 | 229 |
| 31 | 26400 | 41 | 539 | 51 | 216 |
| 32 | 16985 | 42 | 453 | 52 | 202 |
| 33 | 10780 | 43 | 400 | 53 | 189 |
| 34 | 6710 | 44 | 361 | 54 | 178 |
| 35 | 4180 | 45 | 330 | 55 | 167 |
| 36 | 2640 | 46 | 304 | 56 | 156 |
| 37 | 1756 | 47 | 282 | | |
| 38 | 1200 | 48 | 264 | | |
| 39 | 865 | 49 | 246 | | |

*The count times 2.5 equals the retention volume in ml.

Regardless of whether the polyalkene substituent has a relatively high molecular weight or a relatively low molecular weight, it has a carbon atom directly attached to the acylating agents or succinic group(s) and is predominantly of a hydrocarbyl character. Substituents include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic nuclei and the like as well as cyclic substituents wherein the ring is completed through another portion of the molecule (that is, any two indicated substituents may together form an alicyclic radical);

(2) substituted hydrocarbon substituents, that is, those substituents containing non-hydrocarbon radicals which, is the context of this invention, do not alter the predominantly hydrocarbyl substituent; those skilled in the art will be aware of such radicals (e.g., halo (especially chloro and fluoro)), alkoxyl, mercapto, alkylmercapto, nitro, nitroso, sulfoxy, etc.;

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each 10 carbon atoms in the hydrocarbon-based substituents. Typically, there will be no such radicals or heteroatoms in the hydrocarbon-based substituent and it will, therefore, be purely hydrocarbyl.

The polyalkenes from which the substituent groups are derived are homopolymers and interpolymers of polymerizable olefin monomers of 2 to about 16 carbon atoms; usually 2 to about 6 carbon atoms. The interpolymers are those in which two or more olefin monomers are interpolymerized according to well-known conventional procedures to form polyalkenes having units within their structure derived from each of said two or more olefin monomers. Thus, "interpolymer(s)" as used herein is inclusive of copolymers, terpolymers, tetrapolymers, and the like. As will be apparent to those of ordinary skill in the art, the polyalkenes from which the substituent groups are derived are often conventionally referred to as "polyolefins(s)".

The olefin monomers from which the polyalkenes are derived are polymerizable olefin monomers characterized by the presence of one or more ethylenically unsaturated groups (i.e., $>C=<$); that is, they are monoolefinic monomers such as ethylene, propylene, butene-1, isobutene, and octene-1 or polyolefinic monomers (usually diolefinic monomers) such as butadiene-1,3 and isoprene.

These olefin monomers are usually polymerizable terminal olefins; that is, olefins characterized by the presence in their structure of the group $>C=CH_2$. However, polymerizable internal olefin monomers (sometimes referred to in the patent literature as medial olefins) characterized by the presence within their structure of the group

C—C=C—C can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, pentadiene-1,3 (i.e., piperylene) is deemed to be a terminal olefin for purposes of this invention.

As noted above, there is a general preference for aliphatic, hydrocarbon polyalkenes free from aromatic and cycloaliphatic groups. Within this general preference, there is a further preference for polyalkenes which are derived from the group consisting of homopolymers and interpolymers of terminal hydrocarbon olefins of 2 to about 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to about 6 carbon atoms, more preferably 2 to 4 carbon atoms. However, another preferred class of polyalkenes are the latter more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene-1; hexene-1; heptene-1; octene-1; nonene-1; decene-1; pentene-2; propylene-tetramer; diisobutylene; isobutylene trimer; butadiene-1,2; butadiene-1,3; pentadiene-1,2; pentadiene-1,3; pentadiene-1,4; isoprene; hexadiene-1,5; 2-chloro-butadiene-1,3; 2-methyl-heptene-1; 3-cyclohexylbutene-1; 2-methyl-5-propyl-hexene-1; pentene-3; octene-4; 3,3-dimethyl-pentene-1; styrene; 2,4-dichloro styrene; divinylbenzene; vinyl acetate; allyl alcohol; 1-methyl-vinyl acetate; acrylonitrile; ethyl acrylate; methyl methacrylate; ethyl vinyl ether; and methyl vinyl ketone. Of these, the hydrocarbon polymerizable monomers are preferred and of these hydrocarbon monomers, the terminal olefin monomers are particularly preferred.

Specific examples of polyalkenes include polypropylenes, polybutenes, ethylene-propylene copolymers, styrene-isobutene copolymers, isobutene-butadiene-1,3 copolymers, propene-isoprene copolymers, isobutene-chloroprene copolymers, isobutene-(paramethyl)styrene copolymers, copolymers of hexene-1 with hexadiene-1,3, copolymers of octene-1 with hexene-1, copolymers of heptene-1 with pentene-1, copolymers of 3- methyl-butene-1 with octene-1, copolymers of 3,3-dimethyl-pentene-1 with hexene-1, and terpolymers of isobutene, styrene and piperylene. More specific examples of such interpolymers include copolymer of 95% (by weight) of isobutene with 5% (by weight) of styrene; terpolymer of 98% of isobutene with 1% of piperylene and 1% of chloroprene; terpolymer of 95% of isobutene with 2% of butene-1 and 3% of hexene-1; terpolymer of 60% of isobutene with 20% of pentene-1 and 20% of octene-1; copolymer of 80% of hexene-1 and 20% of heptene-1; terpolymer of 90% of isobutene with 2% of cyclohexene and 8% of propylene; and copolymer of 80% of ethylene and 20% of propylene. A preferred source of polyalkenes are the poly(isobutene)s obtained by polymerization of C$_4$ refinery stream having a butene content of about 35 to about 75% by weight and an isobutene content of about 30 to about 60% by weight in the presence of a Lewis acid catalyst such as aluminum trichloride or boron trifluoride. These polybutenes contain predominantly at least about 50%, preferably (greater than about 80% of the total repeating units) of isobutene repeating units of the configuration

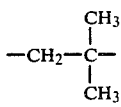

Generally, it is often times desirable that the above-noted substituted polycarboxylic acid acylating agents be free from or exclude having any phosphorus atoms therein.

The procedures for preparing the substituted polycarboxylic acid acylating agents of the present invention are well known to the art and literature as for example as set forth in U.S. Pat. Nos. 3,219,666 and 4,234,435, which are hereby incorporated by reference for expressly teaching the preparation of such acylating agents.

In order to form the reaction product of the present invention, the above-described adduct of the (B) polyamine(s) and the (C) sulfolene(s) is reacted with the (A) substituted polycarboxylic acid acylating agent(s). The reaction is carried out optionally in the presence of a normally liquid, substantially inert organic liquid solvent/diluent at temperatures in the range of from about 80° C. up to the decomposition point of the adduct. Normally the temperature range is about 100° C. up to about 300° C. provided that 300° C. does not exceed the decomposition temperature. Temperatures of from about 125° C. to about 200° or 250° C. are normally used. The amount of the acylating agent normally utilized is such that there exists about two equivalents of acylating agent for every one to five NH groups present in the adduct. In other words, for each substituted succinic acylating agent, there is utilized an amount of adduct containing from 1 to about 5 free amines.

In lieu of forming the adduct first and then reacting it with the substituted acylating agent, all three components can be reacted together, that is at the same time. Due to the decomposition temperature of the sulfolene being fairly low, the reaction, if carried out rapidly, can be up to about 130° C. Otherwise it must be carried out in a temperature range of from about 15° to about 90° C., and more desirably from about 30° to about 80° C. Since this reaction is somewhat time-consuming as well as permits the sulfolenes to react directly with the acylating agents, it is generally not desired. That is, as set forth above, the sulfolene is desirably reacted with the polyamine to form an adduct which in turn is then reacted with the substituted acylating agent.

Alternatively, the (B) polyamine can be first reacted with the (A) acylating agent and subsequently with the (C) sulfolene. In any event, the reaction with the sulfolene is within a temperature range as immediately set forth above.

The compositions of the present invention are useful additives in greases although for the most part they are desirably used in lubricating oils. As previously noted above, the compositions of the present invention, and especially the high molecular weight substituted acylating agent containing composition can be used as viscosity index improvers. However, the primary utility of the compositions of the present invention are as dispersants or detergents in oils. The amount of the composition utilized as a concentrate can be up to about 80% by weight, although often it is less than 20% or 5%.

The reaction products of the invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject additive concentrates are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and other lubricating oil and grease compositions can benefit from the incorporation of the subject additive concentrates.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally the lubricants of the present invention contain an amount of one or more of the reaction product compositions of this invention sufficient to provide them with improved dispersant properties. Normally the amount employed will be about 0.01% to about 20%, preferably about 0.1% to about 10% of the total weight of the lubricating composition.

The invention also contemplates the use of other additives in combination with the sulfolane reaction product of this invention. Such additives include, for example, detergents and dispersants of the ash-producing or ashless type, corrosion- and oxidation-inhibiting agents, pour point depressing agents, extreme pressure agents, antiwear agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

| | | |
|---|---|---|
| 3,163,603 | 3,351,552 | 3,541,012 |
| 3,184,474 | 3,381,022 | 3,543,678 |

| -continued |  |  |
|---|---|---|
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | 4,234,435 |
| 3,346,493 | 3,522,179 | Re 26,433 |

(2) Reaction products of relatively high molecular weight aliphatic or alicyclic halides with amines, preferably olyalkylene polyamines. These may be characterized as "amine dispersants" and examples thereof are described for example, in the following U.S. patents:

| 3,275,554 | 3,454,555 |
|---|---|
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

| 2,459,112 | 3,442,808 | 3,591,598 |
|---|---|---|
| 2,962,442 | 3,448,047 | 3,600,372 |
| 2,984,550 | 3,454,497 | 3,634,515 |
| 3,036,003 | 3,459,661 | 3,649,229 |
| 3,166,516 | 3,461,172 | 3,697,574 |
| 3,236,770 | 3,493,520 | 3,725,277 |
| 3,355,270 | 3,539,633 | 3,725,480 |
| 3,368,972 | 3,558,743 | 3,726,882 |
| 3,413,347 | 3,586,629 | 3,980,569 |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| 3,036,003 | 3,282,955 | 3,493,520 | 3,639,242 |
|---|---|---|---|
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,422 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| 3,329,658 | 3,666,730 |
|---|---|
| 3,449,250 | 3,687,849 |
| 3,519,565 | 3,702,300 |

The above-noted patents are incorporated by reference herein for their disclosures of ashless dispersants.

Extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned auxiliary extreme pressure agents and corrosion-oxidation inhibitors also serve as antiwear agents. Zinc dialkylphosphorodithioates are a well known example.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional antifoam compositions are described in "Foam Control Agents", by Henty T. Kerner (Noyes Data Corporation, 1976), pages 125–162.

The sulfolane reaction product compositions of the present invention can be added directly to lubricant. Preferably, however, they are diluted with a substantially inert, normally liquid organic diluent such as mineral oil, naphtha, benzene, toluene or xylene, to form an additive concentrate. These concentrates usually contain from about 20 to about 90% by weight of a composition of the present invention and in addition thereto may contain one or more other additives known to the art or described herein above. The remainder of the concentrate is a substantially inert normally liquid diluent.

The invention will be better understood by reference to the following examples.

EXAMPLE 1

Tetraethylene pentamine, (TEPA) in an amount of 378 grams and 472 grams of 3-sulfolene are added to a 2-liter flask and warmed to 65°–70° C. The reaction was allowed to continue at this temperature for approximately 5 hours. The reaction product is filtered at room temperature. The filtrate containing 15.0% nitrogen by weight and 14.8% sulfur is the desired product.

EXAMPLE 2

TEPA, 251 grams, and 590 grams of 3-sulfolene are charged to a 2-liter flask and warmed to 62° C. The reactants are held at this temperature for approximately 6 hours and the desired product is produced. The product is separated out by filtering and contained 10.9% by weight of nitrogen and 17.9% by weight of sulfur.

EXAMPLE 3

Polyisobutylene substituted succinic anhydride, 883 grams, and 680 grams of mineral oil are charged to a 3-liter flask and heated to 90° C. under nitrogen. A TEPA/3-sulfolene adduct produced as set forth in Examples 1 and 2 in an amount of 138 grams is added in small portions over 1.5 hours at 90°–110° C. Then, an additional 5% (155 grams) of the diluent oil is added to reduce the viscosity and the temperature is increased to approximately 170°–180° C. for 3 hours under nitrogen sweep to remove any water. The substituted polyisobutylene has a number average molecular weight of approximately 1700. The TEPA/3-sulfolene adduct has approximately 5 nitrogen atoms for each equivalent of sulfolene. The adduct has approximately 3 nitrogen atoms for each two equivalents of the acylating agent. A desired product is obtained having 0.74% by weight of sulfur and 1.53% by weight of nitrogen. The product functioned as a dispersant in engine oil.

EXAMPLE 4

A substituted succinic anhydride, 883 grams is charged to a 3-liter flask along with 716 grams of mineral oil. The flask is heated to 90° C. under nitrogen, and 191 grams of a TEPA/3-sulfolene adduct is added in small amounts over 1.5 hours at 90°–110° C. An additional 5% (163 grams) of the mineral oil is added due to high viscosity and the temperature is increased to 170°–180° C. for 3 hours under a nitrogen sweep to remove any water. A desired product is produced containing 1.56% by weight of sulfur and 1.47% by weight of nitrogen. The substituent of the anhydride is polyisobutylene having a number average molecular weight of about 1700. The TEPA/3-sulfolene adduct is produced in a manner as set forth in Examples 1 and 2. The adduct contains approximately 2½ nitrogen atoms for every equivalent of sulfolene. The adduct also contains approximately 3 nitrogen atoms for every 2 equivalents of acylating agent. The product functioned as a dispersant in engine oil.

EXAMPLE 5

A substituted succinic anhydride, 589 grams, and 656 grams of a mineral oil are charged to a 2-liter flask and heated under nitrogen to 90° C. A TEPA/3-sulfolene adduct in the amount of 85 grams is added in several parts over 1½ hours at 90°–110° C. The temperature is then increased to 170°–180° C. for 5 hours. Nine milliliters of water are collected with the residue being the desired product containing 0.66% by weight of sulfur and 1.12% by weight of nitrogen. The substituent of the succinic anhydride is polyisobutylene having a number average molecular weight of approximately 1700. The TEPA/3-sulfolene adduct is produced in a manner according to Examples 1 and 2 and contains approximately 2½ nitrogen atoms for each equivalent of weight of sulfolene. The number of nitrogen atoms in the adduct is approximately 2 for each 2 equivalents of acylating agent. The product functioned as a dispersant in a 10 W-30 motor oil.

EXAMPLE 6

A substituted succinic anhydride, 589 grams, and 682 grams of mineral oil are charged to a 2-liter flask and heated under nitrogen to 90° C. A TEPA/3-sulfolene adduct in the amount of 111 grams is slowly added over one hour at 90° C. with increased viscosity. The temperature is then increased to about 170°–180° C. for 8 hours under nitrogen and filtered at 140° C. Approximately 9 millimeters of aqueous material are removed. The remaining residue is the desired product which contains 1.02% by weight of sulfur and 1.1% by weight of nitrogen. The substituent of the succinic anhydride is polyisobutylene having a number average molecular weight of about 1700. The adduct is obtained in the manner as set forth in Examples 1 and 2. The number of nitrogen atoms in the adduct per equivalent of sulfolene is approximately 1.6. The number of nitrogen atoms in the adduct is approximately 2 per 2 equivalents of acylating agents. The product functioned as a dispersant in engine oil.

EXAMPLE 7

A polyisobutylene substituted succinic anhydride, 589 grams, and 714 grams of mineral oil are charged to a 3-liter flask and heated to 90° C. under nitrogen. A TEPA/3-sulfolene adduct in the amount of 135 grams is slowly added over one hour at 90°–100° C. The mixture is then heated to 170°–180° C. under nitrogen for 6 hours with 7 milliliters of aqueous material collected in a trap. A desired product is obtained having 1.34% sulfur by weight and 0.96% nitrogen by weight. The polyisobutylene substituent has a molecular weight as set forth in the preceding examples. The adduct is made in a manner as set forth in Examples 1 and 2. The adduct contains approximately 1.25 nitrogen atoms per equivalent of sulfolene. The ratio of the nitrogen atoms in the adduct per 2 equivalent acylating agents is approximately 2. The product functioned as a dispersant in engine oil.

EXAMPLE 8

The compound 3-sulfolanylamine is utilized in this example as purchased from Shell Chemical Co. Polyisobutylene substituted succinic anhydride, 590.5 grams, and 933 grams of mineral oil and 200 milliliters of toluene are charged to 2-liter flasks and warmed to 100° 1 C. The 3-sulfolanylamine is then added in several increments at approximately 105° C. The mixture is heated under nitrogen with removal of water, approximately 5.7 milliliters. An additional 6.7 grams of sulfolanylamine is added and the flask heated to 180° C. under nitrogen. The products are stripped with an aspirator at 150° C. and 30 millimeters of mercury and filtered. The desired product is obtained having 1.32% by weight of sulfur and 0.64% by weight of nitrogen. The polyisobutylene has a molecular weight as set forth above. The number of nitrogen atoms per 2 equivalent acylating agents is 1. The product functioned as a oil dispersant in engine oil.

EXAMPLE 9

A polyisobutylene substituted succinic anhydride-polyamine in the amount of 700 grams is charged to a 2-liter flask and warmed to 50° C. Mineral oil in the amount of 20 grams is added. Then, 29.5 grams of 3-sulfolene is added and the flask warmed to 60°-70° C. for 4 hours and held at approximately 70°-80° C. for an additional hour. The solution is then heated at aspirator vacuum to 110-115 for 3 hours, and filtered. The desired product is obtained having 0.95% by weight of sulfur. The polyisobutylene is a low molecular weight type, having a number average molecular weight of approximately 1000. The number of nitrogen atoms per 2 equivalents of acylating agents is 3. The product functioned as a dispersant in an engine oil.

EXAMPLE 10

A polyisobutylene substituted succinic anhydride-polyamine, 700 grams, of the type set forth in Example 9 is charged to a 2-liter flask along with 40 grams of mineral oil. The reactants are heated to a temperature of approximately 65° C. and 59 grams of 3-sulfolene is charged and held at approximately 80° C. for one day. The solution is then heated to 110° C. at aspirator pressure and held for 3 hours. Some solid is collected in an overhead. The solution is then filtered to obtain the product. A desired product is obtained having 1.37% sulfur by weight. The number of nitrogen atoms per 2 equivalents of acylating agents is 3. The product functioned as a dispersant when utilized in engine oil.

EXAMPLE 11

A polyisobutylene substituted succinic anhydride-polyamine, 779 grams, along with 17 grams of mineral oil are charged to a 2-liter flask and heated to 70° C. The compound 3-sulfolene in an amount of 15 grams is charged and held at 70°-80° C. for approximately 3 hours. The solution is stripped with an aspirator at approximately 110° C. and held for 3 hours under vacuum. It is then filtered. A desired product is obtained having 0.27% by weight of sulfur. The polyisobutylene has a number average molecular weight of approximately 1700. The product functioned as a dispersant in engine oil.

While in accordance with the patent statutes, a best mode and preferred embodiment has been set forth, the scope of the invention is set forth by the scope of the attached claims.

We claim:

1. An oil soluble dispersant composition comprising: the reaction product of (A) at least one polycarboxylic acid acylating agent having at least one polyalkene substituent having an Mn value of about 300 to about 5000 and a Mw value of about 500 to about 2000 with (B) a polyamine and (C) a sulfolene, said acylating agents having within their structure an average of at least 0.5 acylating groups for each equivalent weight of said polyalkene group, said reaction being conducted at a temperature from about 15° C. to about 300° C.

2. An oil-soluble dispersant composition according to claim 1 wherein said (B) polyamine has the formula

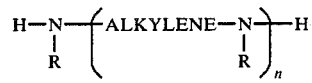

wherein n is an integer of 20 or less, wherein R is hydrogen, a substantially hydrocarbon group containing up to 30 carbon atoms, an amino-substituted hydrocarbon having up to 30 carbon atoms, a polyamino-substituted hydrocarbon having up to 6 amino groups and up to 30 carbon atoms, or a hydroxylalkyl substituent wherein said alkyl group has from 1 to 6 carbon atoms, and wherein said "ALKYLENE" has from 1 to 10 carbon atoms.

3. An oil-soluble dispersant composition according to claim 2 wherein said (C) sulfolene has the formula

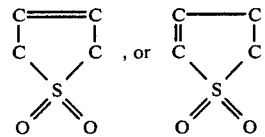

wherein each said carbon atom in said formula can have 1 or 2 (C) substituents, each said (C) substituent can be the same or different, wherein each said (C) substituent is an aliphatic having from 1 to 18 carbon atoms, a cycloaliphatic having from 4 to 10 carbon atoms, an aromatic substituted aliphatic having from 7 to 18 carbon atoms, an aromatic or an aliphatic substituted aromatic having from 6 to 12 carbon atoms, or sulfur; and wherein said (C) substituent can contain COOH, Cl, N, OH, CO, OR$^3$, COOR$^3$, and sulfur functional groups wherein R$^3$ is an alkyl having from 1 to 20 carbon atoms.

4. An oil-soluble dispersant composition according to claim 3 wherein said (A) polyalkene substituent has an Mn value of 1200 or less and an Mw value of 900 to 3500.

5. An oil-soluble dispersant composition according to claim 4 wherein said acylating agents correspond to the formula

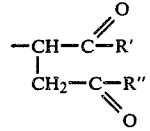

wherein R' and R" are each independently selected from the group consisting of —OH, —Cl, and —O—lower alkyl and, when taken together, R' and R" are —O—, with the proviso that all the acylating groups need not be the same.

6. An oil-soluble dispersant composition according to claim 5 wherein said acylating agent substituent is selected from the group consisting of homopolymers and interpolymers of terminal olefins of 2 to about 16 carbon atoms with the proviso that said interpolymers can actually contain up to about 40% of the polymer units derived from internal olefins of up to 16 carbon atoms.

7. An oil-soluble dispersant composition according to claim 6 wherein said sulfolene (C) substituent is selected from the group consisting of an alkyl having from 1 to 18 carbon atoms, a cycloalkyl having from 5 to 8 carbon atoms, an alkenyl having from 2 to 18 carbon atoms, phenyl, an aryalkyl having from 7 to 12 carbon atoms, and sulfur; and an alkylaryl having from 7 to 12 carbon atoms, and wherein said (C) substituted groups can contain COOH, Cl, N, OH, CO, OR$^3$, COOR$^3$ and S functional groups wherein R$^3$ is alkyl having from 1 to 20 carbon atoms.

8. An oil-soluble dispersant composition according to claim 7 wherein said acylating agent has an average of at least 0.7 to about 1.3 acylating groups for each equivalent weight of said (A) substituent group and wherein said (B) polyamine is first reacted with said (C) sulfolene to produce an adduct (BC), and wherein said adduct (BC) is reacted with said (A) substituted acylating agent.

9. An oil-soluble dispersant composition according to claim 8 wherein the amount of (B) polyamine is such that the number of nitrogen atoms from said (B) polyamine is from 1 to about 10 for each sulfolene equivalent.

10. An oil-soluble dispersant composition according to claim 9 wherein said substituent of said acylating agent is derived from one or more polyalkene selected from the group consisting of homopolymers and interpolymers of terminal olefins of 2 to about 6 carbon atoms with the proviso that said interpolymers can actually contain up to about 25% of polymer units derived from internal olefins of up to about 6 carbon atoms, and wherein R of said (B) polyamine is selected from the group consisting of hydrogen, substantially hydrocarbon containing up to 8 carbon atoms, an amino-substituted hydrocarbon having up to 8 carbon atoms, and a polyamine-substituted hydrocarbon having up to 6 amino groups and up to 8 carbon atoms.

11. An oil-soluble dispersant composition according to claim 10 wherein said (A) substituent has an Mn value of 700 to 1200 and an Mw value of 1800 to 3500, and wherein said (B) polyamine has at least two primary amine groups therein.

12. An oil-soluble dispersant composition according to claim 11 wherein the amount of said (BC) adduct is from about 1NH to 5NH per two equivalent acylating groups of said (A) acylating agent, and wherein the amount of (B) polyamine is such that the number of nitrogen atoms from said (B) polyamine is from 1 to about 5 for each sulfolene equivalent.

13. An oil-soluble dispersant composition according to claim 12 wherein said acylating agent corresponds to the formula

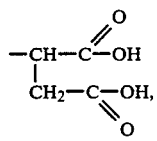

-continued

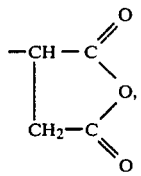

and mixtures thereof, and wherein said acylating substituents are derived from a member selected from the group consisting of polybutene, ethylenepropylene copolymer, polypropylene, and mixtures of two or more of any of these.

14. An oil-soluble dispersant composition according to claim 13 wherein said substituent groups are derived from polybutene in which at least about 50% of the total units are derived from isobutene.

15. An oil-soluble dispersant composition according to claim 14 wherein said "ALKYLENE" of said (B) polyamine has from 1 to 6 carbon atoms.

16. An oil-soluble dispersant composition according to claim 3 wherein said (A) polyalkene has an Mn value of 900 to about 500 and a Mw/Mn value of about 1.5 to about 4.0.

17. An oil-soluble dispersant composition according to claim 16 wherein said acylating agents correspond to the formula

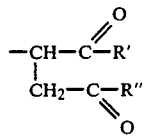

wherein R' and R'' are each independently selected from the group consisting of —OH, —Cl, and —O— lower alkyl and, when taken together, R' and R'' are —O—, with the proviso that all the acylating groups need not be the same.

18. An oil-soluble dispersant composition according to claim 17 wherein said acylating agent substituent is selected from the group consisting of homopolymers and interpolymers of terminal olefins of 2 to about 16 carbon atoms with the proviso that said interpolymers can actually contain up to about 40% of polymer units derived from internal olefins of up to 16 carbon atoms.

19. An oil-soluble dispersant composition according to claim 18 wherein said sulfolene (C) substituent is selected from the group consisting of an alkyl having from 1 to 18 carbon atoms, a cycloalkyl having from 5 to 8 carbon atoms, an alkenyl having from 2 to 18 carbon atoms, phenyl, an aryalkyl having from 7 to 12 carbon atoms, an alkylaryl having from 7 to 12 carbon atoms, and sulfur, and wherein said (C) substituted groups can contain COOH, Cl, N, OH, CO, OR$^3$, COOR$^3$ and S functional groups wherein R$^3$ is alkyl having from 1 to 20 carbon atoms.

20. An oil-soluble dispersant composition according to claim 19 wherein Mn is at least 1500 and wherein Mw/mn is at least 1.8 and wherein said acylating agent has an average of at least 1.3 acylating groups for each equivalent weight of said (A) substituent groups, and wherein said (B) polyamine is first reacted with said (C) sulfolene to produce an adduct (BC), and wherein said adduct (BC) is reacted with said (A) substituted acylating agent.

21. An oil-soluble dispersant composition according to claim 20 wherein the amount of (B) polyamine is such that the number of nitrogen atoms from said (B) polyamine is from 1 to about 10 for each sulfolene equivalent.

22. An oil-soluble dispersant composition according to claim 21 wherein said substituent of said acylating agent is derived from one or more polyalkene selected from the group consisting of homopolymers and interpolymers of terminal olefins of 2 to about 6 carbon atoms with the proviso that said interpolymers can actually contain up to about 25% of polymer units derived from internal olefins of up to about 6 carbon atoms, and wherein R of said (B) polyamine is selected from the group consisting of hydrogen, substantially hydrocarbon containing up to 8 carbon atoms, an amino-substituted hydrocarbon having up to 8 carbon atoms, and a polyamine-substituted hydrocarbon having up to 6 amino groups and up to 8 carbon atoms.

23. An oil-soluble dispersant composition according to claim 22 wherein said (B) polyamine has at least two primary amine groups therein, wherein the amount of said (BC) adduct is from about 1NH to 5NH per two equivalent acylating groups of said (A) acylating agent, and wherein the amount of (B) polyamine is such that the number of nitrogen atoms from said (B1) polyamine is from 1 to about 5 for each sulfolene equivalents.

24. An oil-soluble dispersant composition according to claim 23 wherein said acylating agent corresponds to the formula

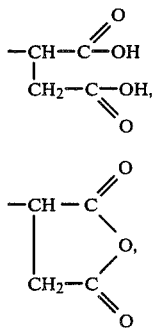

and mixtures thereof, and wherein said acylating substituents are derived from a member selected from the group consisting of polybutene, ethylene-propylene copolymer, polypropylene, and mixtures of two or more of these.

25. An oil-soluble dispersant composition according to claim 24 wherein said acylating agents are characterized by the presence within their structure of an average from about 1.5 to 2.5 groups for each equivalent weight of the substituent group, wherein said Mn is about 1500 to about 2800 and wherein Mw/Mn is about 2.0 to about 3.4.

26. An oil-soluble dispersant composition according to claim 25 wherein said substituent groups are derived from polybutene in which at least about 50% of the total units are derived from isobutene, wherein said "ALKYLENE" of said (B) polyamine has from 1 to 6 carbon atoms.

27. An oil-soluble dispersant composition according to claim 4 wherein said (C) sulfolene substituents is a total of from 0 or 1 substituent and wherein said sulfolene substituent is methyl.

28. An oil-soluble dispersant composition according to claim 8 wherein said (C) sulfolene substituents is a total of from 0 or 1 substituent and wherein said sulfolene substituent is methyl.

29. An oil-soluble dispersant composition according to claim 12 wherein said (C) sulfolene substituents is a total of from 0 or 1 substituent and wherein said sulfolene substituent is methyl.

30. An oil-soluble dispersant composition according to claim 13 wherein said (C) sulfolene substituents is a total of from 0 or 1 substituent and wherein said sulfolene substituent is methyl.

31. An oil-soluble dispersant composition according to claim 15 wherein said (C) sulfolene substituents is a total of from 0 or 1 substituent and wherein said sulfolene substituent is methyl.

32. An oil-soluble dispersant composition according to claim 16 wherein said (C) sulfolene substituents is a total of from 0 or 1 substituent and wherein said sulfolene substituent is methyl.

33. An oil-soluble dispersant composition according to claim 20 wherein said (C) sulfolene substituents is a total of from 0 or 1 substituent and wherein said sulfolene substituent is methyl.

34. An oil-soluble dispersant composition according to claim 24 wherein said (C) sulfolene substituents is a total of from 0 or 1 substituent and wherein said sulfolene substituent is methyl.

35. An oil-soluble dispersant composition according to claim 25 wherein said (C) sulfolene substituents is a total of from 0 or 1 substituent and wherein said sulfolene substituent is methyl.

36. An oil-soluble dispersant composition according to claim 26 wherein said (C) sulfolene substituents is a total of from 0 or 1 substituent and wherein said sulfolene substituent is methyl.

37. An oil-soluble dispersant composition according to claim 1 wherein said reaction product is utilized as a lubricating additive concentrate in an amount of up to about 80% by weight.

38. An oil-soluble dispersant composition according to claim 16 wherein said reaction product is utilized as a lubricating additive concentrate in an amount of up to about 80% by weight.

39. An oil-soluble dispersant composition according to claim 1 wherein said reaction product is utilized in a lubricating composition in an amount of up to about 20% by weight.

40. An oil-soluble dispersant composition according to claim 16 wherein said reaction product is utilized in a lubricating composition in an amount of up to about 20% by weight.

* * * * *